INVENTORS
MAYNARD J. DE GOOD
CLYDE L. BOWMAN
BY
ATTORNEYS

Aug. 30, 1966  M. J. DE GOOD ET AL  3,269,519
HIGH SPEED TAKE-OFF

Filed Dec. 15, 1964  2 Sheets-Sheet 2

INVENTORS
MAYNARD J. DE GOOD
CLYDE L. BOWMAN
BY
ATTORNEYS 3,269,519
HIGH SPEED TAKE-OFF
Maynard J. De Good and Clyde L. Bowman, Grand Rapids, Mich., assignors to The Rapids-Standard Company, Inc., Grand Rapids, Mich., a corporation of Michigan
Filed Dec. 15, 1964, Ser. No. 418,477
5 Claims. (Cl. 198—127)

This invention relates to conveyors, and more particularly to article propelling means on a conveyor, especially high speed take-off propelling means to remove articles laterally from a conveyor.

Known article diverters for conveyors have a variety of different forms. Some, such as swinging sweep-off arms and angled idler wheels, operate merely by intercepting the article path so that the article's momentum carries it off the conveyor. Others employ a powered propelling means, such as a belt, which contacts the article and diverts it with supplied power. In fact, continuous belts are widely employed for propelling articles along a conveyor as well as for diverting articles.

Diverting of articles, however, causes distinct problems due to change of direction and resulting possible conflict between articles. This is particularly true for higher speed conveyors, especially where articles are closely positioned. Selective, individual article diverting from the conveyor then becomes difficult to achieve. As one article such as a carton is changing direction from 15–90°, it pauses momentarily at least in its original direction vector, and thus obstructs the path of following articles.

If the articles are moving rapidly, a diverter raised beneath one article must ordinarily be kept raised until the diverted article is well off the conveyor. Hence, it tends to divert the following article also, or at least to turn it askew. Even then, the selected article may not yet be completely off the conveyor, causing even further interference with the skewed, following article. A high speed reciprocating knock-off element such as a fluid cylinder and plunger may be satisfactory for some uses, but is not so for many systems. In many cases, the articles or their packages are too fragile to be subjected to the impact of such equipment.

While it might be suggested to speed up the powered diverter, the propelling means of known devices should not be operated continuously at such high speeds because of excessive wear and other factors causing frequent failure. Also, this frequently causes excessive noise. It has been desired to employ chains for diverting, due to their strength. However, to drive chains at such high speeds is not wise.

What is really needed, therefore, is an article propelling mechanism that is quick to shift into operative position in a highly selective manner, to pick one or more articles out of a group of closely positioned articles, and then immediately retract to eliminate interference with following articles. It must change the direction of and divert the selected article laterally from the conveyor at high speed, while the driving means such as chains for the diverter propelling means are moving at a relatively low speed. It must be capable of continuing to propel the selected article at the high rate of speed in the diverting direction even after the diverter has again retracted out of the path of non-selected following articles.

It is, therefore, an object of this invention to provide a powered article propelling means on conveyors whereby the articles are propelled at high speeds while the driving elements for the propelling means move at a relatively low speed. This is done without striking the article, but rather with a smooth even action. Further, minimal frictional relative movement occurs between the article contacting surfaces of the propelling means and the articles themselves. The device can be driven by endless elements, even chains, without imparting high speeds thereto. The propelling means can be selectively activated instantly, to be operative on selected conveyed articles, or inactivated instantly, out of contact with the articles. Yet, the propelling device is in constant motion for immediate use, even when shifted to inactive condition, so as not to cause a delay when activated, and not abruptly and repeatedly started and stopped.

Another object of this invention is to provide a high speed article take-off or diverting means for conveyors, having capacity to laterally divert articles at a selected, sharp angle, rapidly, without components such as chains moving at high speed. The articles are diverted smoothly, without significant frictional action between the diverter and the articles. The take-off mechanism is quick in response when activated and de-activated, to be highly selective for individual articles. It can divert without difficulty selected articles, one or more, whether adjacent or spaced, from an entire series of closely packed, end to end articles. The novel device utilizes a constantly moving diverter means having a multiple contact, smooth, rolling engagement with the articles.

Another object of this invention is to provide a high speed article diverter for conveyors wherein the diverter means may be raised by power means for quick action, to assure diversion of articles, and which has maximum speed and efficiency of diversion, yet without the weight of the articles being applied to the power means itself.

Another object of this invention is to provide a vertically shiftable high speed diverter that, even when lowered to inactive position to prevent diversion of following articles, still continues to propel newly diverted articles, yet with a relatively simple and reliable structure.

These and several other objects of this invention will become apparent upon studying thé following specification in conjunction with the drawings in which.

Figure 1:
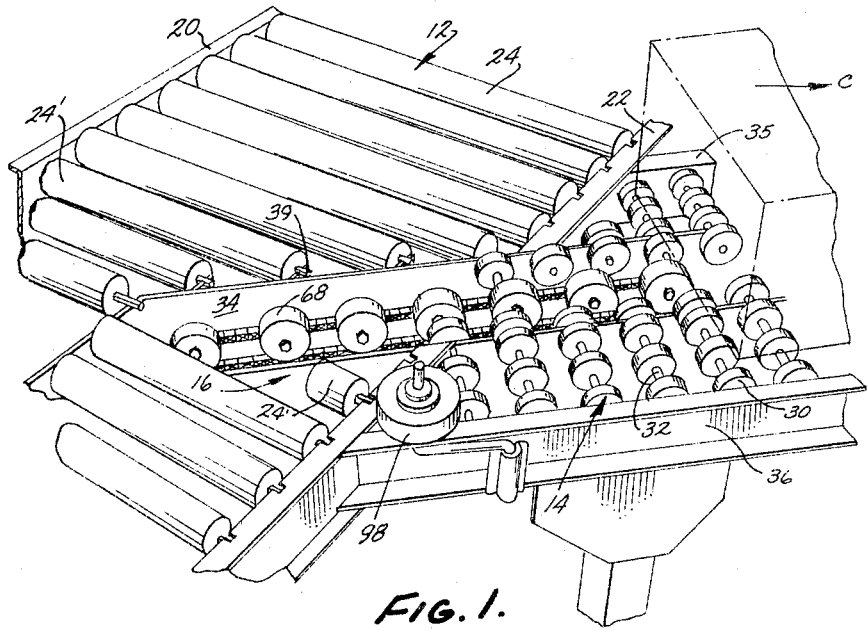
FIG. 1 is a perspective view of the invention as a diverter mechanism from a main conveyor to a branch or spur conveyor.

Referring now specifically to the drawings, the conveyor system 10 in FIG. 1 includes a conveyor 12, a branch or spur conveyor 14, and the overlapping diverting mechanism 16.

Figure 2:
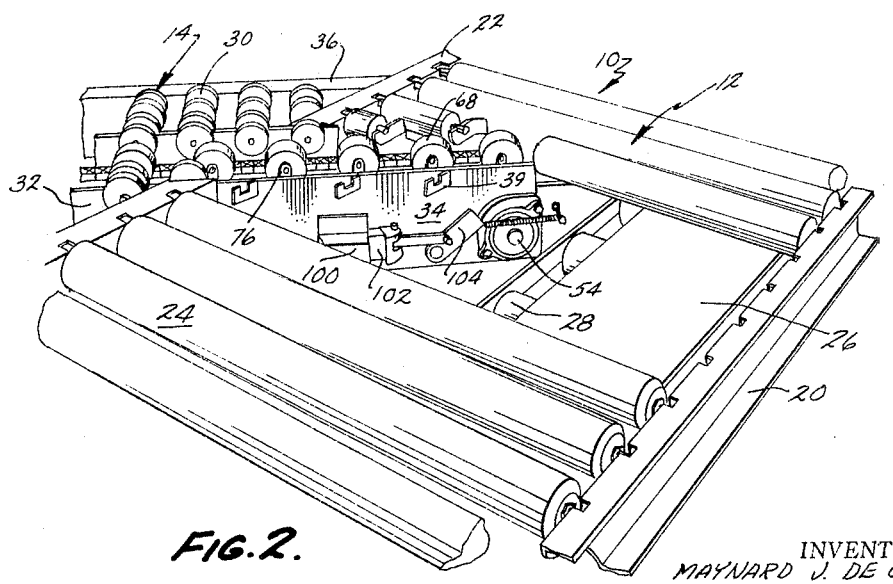
FIG. 2 is a perspective view of the conveyor junctions illustrated in FIG. 1, but taken from the opposite side of the structure, and shown with rollers removed from the main conveyor to illustrate the diverter more clearly.

The main conveyor 12 has a pair of spaced parallel side rails 20 and 22, between which are mounted a plurality of rotatable, low-friction article supports, here shown as elongated rollers 24. These articles supports can also be conveyor wheels or some other equivalent conveyor surface within the context of this invention. This main conveyor is preferably powered as by a continuous belt 26 supported on pressure rollers 28 (FIG. 2) in contact with the underside of the rollers. It may alternatively be driven by other known apparatus, or it may even be a gravity type conveyor.

It will be realized that the designation "main" conveyor is merely for convenience, and is intended to designate a conveyor from which articles are diverted by the diverting mechanism. It may be any one of several conveyors in a system.

Branch or spur conveyor 14 has a plurality of rotatable, low-friction article supports, here shown in the form of conveyor wheels 30. These are mounted in usual fashion on a plurality of parallel axles 32 suspended between a pair of side rails 35 and 36. These side rails have ends which abut and are affixed to side rail 22 as by welding or bolting. The spur conveyor is at an angle of about 135° to the main conveyor. This angle may be greater or smaller, however.

The conveying surface formed by the conveyor wheels of spur conveyor 14 is generally coplanar with that of conveyor 12, but may tilt slightly therefrom. The wheels of this conveyor could be rollers or another known low-friction conveying surface. The presence of low-friction, rotatable elements on both conveyors is preferred with the novel diverter.

The diverter assembly 16 actually overlaps or extends into both conveyors, being generally co-directional with the spur conveyor and at an obtuse angle to the main conveyor. It intersects the main conveyor and extends about half way across it. Its mechanism is supported by and largely between a pair of spaced, parallel, upright, elongated mounting plate supports 33 and 34 generally astraddle the center of conveyor 14. They are rigidly affixed to side rail 22 which they intersect. Since the space between these plates must be free of the regular rollers, rollers 24' adjacent thereto are foreshortened in successively increasing manner (FIG. 1). The ends of the rollers adjacent plate 34 are rotatably mounted thereto as by having their axles received in slotted flanges 39.

This diverter assembly includes a pair of spaced, continuously driven, endless elements, preferably in the form of chains 40. These pass around a first pair of respective sprockets 44 and 46 mounted on an axle 48 at one end, the downstream end of the plates, and around a second pair of like, respective sprockets 50 and 52 on axle 54 on the opposite upstream end of the assembly. These chains are driven continuously by a prime mover 56 such as an electrical motor. Motor 56 preferably drives the apparatus through a typical power amplifying, speed decreasing gear box 64. The gear box output drives sprocket 58, chain 60 and sprocket 62 on the end of axle 48. Suspended between chains 40 and 42, at spaced intervals, and rollably mounted thereto, are a plurality of like wheels 68, the peripheral surfaces of which form propelling means.

Figure 6:
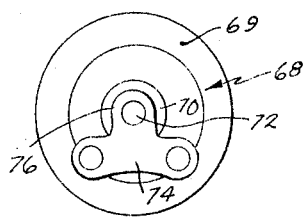
FIG. 6 is a side elevational view of one of the diverting mechanism wheels and its connecting chain link.

Each wheel includes a high friction, outer surface, tire portion 69, preferably of rubber, and a hub 70 mounted on an axle 72. Each axle is rotatably supported between two special links 74 of the chains. Each of these special links includes a raised shoulder 76 (FIG. 6) to receive axles 72 that rotatably support the wheels.

Figure 3:
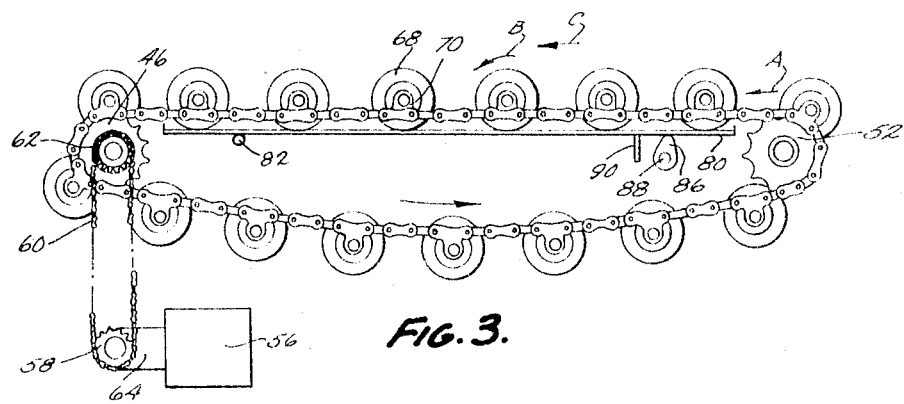
FIG. 3 is a side elevational view of the diverter assembly.

The plurality of wheels are in a common plane, and are driven by the chains to move therewith through an upper pass and a return, suspended lower pass (FIG. 3). When passing through the upper pass, the wheels ride along a track surface formed by an elongated track plate 80. It extends most of the distance between the sprockets, and terminates just short of each axle to allow the wheels to curve around the ends of the unit as guided by the sprocket and chain engagement. The track is positioned between chains 40 and 42. This track retains the wheels 68 in a particular vertical relationship along their upper pass movement. It also causes the wheels to rotate due to their contact against the track as they are driven therealong by the chains. When the weight of an article presses on the wheels, the increased frictional force assures wheel rotation.

Figure 5:
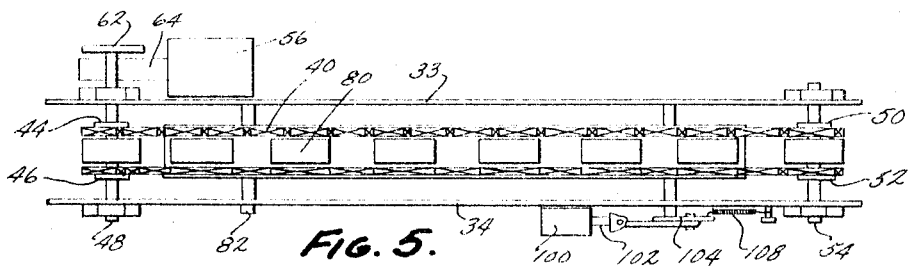
FIG. 5 is a plan view of the major components of the diverting assembly.

During the normal inactive condition of the diverting mechanism, the chains and wheels keep circulating continuously, at constant speed. Inactivation is achieved by vertical positioning of the wheels, not by stopping the movement of the mechanism. This is achieved by control of the vertical position of track 80. Near the downstream or discharge end of the diverter mechanism, the track is mounted on a transverse pivot axle 82 which extends between plates 33 and 34 (FIG. 5). This pivot axis is purposely located several inches back from the downstream terminal end of track 80 to control the height of the overhanging portion thereof for a reason to be described hereinafter.

Adjacent the upstream or receiving end of track 80 is a vertical hoisting mechanism. This preferably includes an eccentric cam 86 mounted on axis 88 and contacting the underside of track 80 near its upstream end. Rotation of this cam from the lowered position illustrated in FIG. 3, to a second raised position against a stop 90 affixed to the bottom side of track 80, raises the track from the retracted position (illustrated in solid lines in FIG. 4) to the active or raised position, illustrated in phantom lines. It, thus, raises the upper surfaces of the wheels 68 into position to contact the articles on the main track 12.

Figure 4:
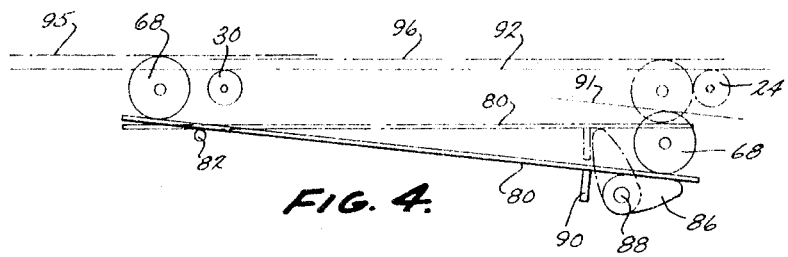
FIG. 4 is a schematic, side elevational view of the apparatus in FIG. 3, showing its vertical operation positions.

More specifically, referring to FIG. 4, when inactive or lowered, the diverter wheels 68 at the upstream end of the assembly have their upper surfaces at a plane 91 below the article contact plane or conveyor surface 92 of rollers 24. As such, they are in a non-diverting condition. By shifting cam 86 rotationally on its axis against stop 90, where its lobe raises platform 80 to the phantom position illustrated in FIG. 4, the upper surfaces of diverting wheels 68 at the upstream end of the diverter assembly project to a position 96 above the conveyor plane 92 of the rollers. The elevated diverter wheels are, therefore, in the path of articles passing along conveyor 12 so that their undersides will be contacted and acted upon by the diverter wheels. Since the wheels are being driven by chains 42 and 40 in the direction of the branch conveyor, the articles will be diverted around the guide wheel 98 (FIG. 1) and onto the spur conveyor. In this elevated condition, the diverter wheels 68 at the downstream end of the diverter assembly will also be slightly above the common plane 96 of the branch conveyor, i.e. the upper surfaces of its rollers 30, as illustrated in FIG. 4. Thus, the articles are propelled along the entire length of the diverter mechanism.

Elevation of track 80 can be achieved by a variety of power elements. The one shown is an electrical solenoid 100 (FIG. 5) mounted to the outside face of plate 34. It has a shiftable armature 102, extending therefrom and pivotally connected at its outer end to the center of a pivot link 104. The lower end of the link is affixed to the extended end of axle 88, so that pivoting of link 104 rotates the cam axle and the cam. Link 104 has a tension spring 108 connected between its upper end and the mount plate 34 to bias it to the inactive lowered position. Armature 102, when retracted by solenoid 100, pivots link 104, against the bias of spring 108, to shift cam 86 to its elevated position against its stop 90, thereby raising the track 80. Since cam 86 moves past center, i.e. its lobe moves over the top of the pivot axis, and into a binding relationship between track 80 and stop 90, weight applied on track 80 through wheels 68 is exerted solely on the track, cam and stop mechanism rather than on the power shifting means. Hence, powered shifting can be readily done with a small power unit, since stress is applied to the mechanism components of the assembly rather than to the power unit itself.

This particular diverter structure has a high speed diverting action compared to the linear rate movement of its elements, including its chains and wheels. This is because of the relationship of the driven wheels with the underlying track over and upon which the wheels move. More specifically, since the wheels are being positively moved by the chain in direction A (FIG. 3), and they are rotated in direction B by their contact with the track, their total peripheral speed with respect to the conveyor, equals the lineal speed of the chain multiplied by two. Thus, the rate of speed of the article, such as the carton in FIG. 1, in the direction C (FIGS. 1 and 3) will equal twice the chain speed in the same direction. Hence, by moving the chain assembly at a relatively low speed, high speed take-off can be readily accomplished. Therefore, quick diversion is effected, by rapid acceleration of the diverted article out of the path of the following article on the main conveyor.

The diverter wheels 68 at the downstream end of the diverter assembly (FIG. 4) are always elevated to a position or plane 95 above plane 92 of the secondary conveyor for a length of several inches. This is due to the location of pivot axis 82 for track 80. This is purposely done so that even when the upstream end of the diverter assembly is momentarily raised to divert a carton or other article, and then quickly lowered beneath the plane of main conveyor 12 so as to be inactivated and not divert subsequent articles, the downstream end of the diverter will continue to propel the diverted article to assure the completion of its diversion from the main conveyor and discharge onto the branch conveyor, even though the diverter assembly may have been activated for only a few seconds or even a fraction of a second. The diverter is, therefore, highly selective, immediately responsive, fast acting and complete and continuous in article propelling, yet without excessive speed of components.

The power source for the cam 86 such as the solenoid, or any pneumatic, mechanical, hydraulic, or electrical substitute actuating means, can be controlled by a manual electrical, pneumatic or other signal means operated by a person or by the articles themselves according to a sensing or preset code system. The diverter thus will select and shoot off, gently, yet at a high speed, one particular article, and then immediately drop down to avoid interference with the next following article. The diverted article will continue to be propelled positively along the branch conveyor to assure its removal from the path of articles moving along the main conveyor, or subsequently diverted articles.

Instead of diversion onto a branch conveyor as shown, it may be diverted onto any other suitable receiver such as a work station, elevator, or a variety of other article-receiving means found in such systems.

It will be realized that a variety of systems can incorporate this unique diverter in a particular manner. Certain structural details may have to be changed for each system from those illustrated, depending upon the arrangement in which it is employed. Hence, the descriptive matter set forth in the particular preferred illustration is not intended to be limiting in nature.

The propelling device could also be employed as an accelerator along the main conveyor path, in the broader aspects of this invention. In such a case, it would probably be desirable to pivot the entire length of the track up or down all at once so it could drop all accelerating wheels below the conveyor surface. The track could be shifted reciprocally, rather than rotationally, to achieve this.

As another factor, although sufficiently high speed take-off is normally achieved by the double speed action of this device when the diverter wheels are moved over a stationary track, the propulsion could be highly variably regulated by controlled movement of the track simultaneously with movement of the chains and wheels. Multiple speeds could be obtained by moving track 80 in a direction opposite to the movement of the chains or other endless elements 40 and 42. This could be achieved for example, by substituting a continuous circulating belt as a track, and revolving it in a direction opposite to that of the chains 40 and 42. The article speed can be increased a multiple of times in this fashion. Article take-off could also be less than twice chain speed, but greater than chain speed by moving the underlying belt track in the same direction as the chains, but at a slower speed. Thus, by controlling the speed of the belt, the rate of diversion could be accurately varied.

Thus, the terms "track" and "rolling surface" used herein in connection with element 80 under the propelling elements 68, in their broadest aspects, include these variations of stationary or movable driven means.

It is also conceivable that the underlying surface or track beneath the rotatable wheels 68 could be shifted from a first lowered position out of engagement with the wheels to a second elevated postion in engagement therewith causing the wheels to rotate as they are moved along it. That is, the wheels would still be constantly circulated with the chains or other endless drive means, but would normally not be rotataing. When contacted from beneath by the track, they would rotate as they rolled along it.

Certain additional changes not specifically mentioned could be made in the type of endless elements, drive means, rolling elements or other conveyor surface, side rails, supports and the like within the novel concept. Hence, the invention is intended to be limited only by the scope of the appended claims and the reasonably equivalent structures to those defined therein.

We claim:

1. A conveyor apparatus with power diverting means comprising: means forming a main article conveying surface, and a branch article conveying surface at an angle to said main surface; article diverting means oriented along said branch surface and overlapping both surfaces; said diverting means having a plurality of rotatable elements, and having circuitous, endless, flexible drive means drivingly and rotatably mounting said rotatable elements in a forward path portion overlapping said main surface and said branch surface and oriented along said branch surface and a return path portion below the level of said main surface and branch surface; an elongated vertically shiftable support track underlying said rotatable elements in said forward path portion, being vertically shiftable between elevated and lowered positions, and causing, when in said elevated position, said rotatable elements to project above the level of said main and branch surfaces while rolling along said support track; power operating means connected to said flexible drive means to drive said rolling elements along said support track to divert articles from said main surface to said branch surface; and means to raise and lower said support track and rolling elements with respect to said main surface for selective diverting.

2. A conveyor apparatus with power diverting means comprising: means forming a main article conveying surface, and a branch article receiving surface at an angle to said main surface; article diverting means oriented along said branch surface and overlapping said main surface at said angle; said diverting mean having a plurality of rotatable elements, and circuitous, endless, flexible drive means drivingly and rotatably mounting said rotatable elements in a forward path portion overlapping said main surface and said branch surface and oriented along said branch surface and a return path portion below the level of said surfaces; an elongated vertically shiftable support track underlying said rotatable elements in said forward path portion, being vertically shiftable between elevated and lowered positions, and causing, when in said elevated position, said rotatable elements to project above the level of said main and branch surfaces; power operating means operably connected to said flexible drive means to drive said rotatable elements along said support track and propellingly divert articles from said main surface to said branch surface; said support track being pivotally mounted near its downstream end to said conveyor apparatus at said branch conveying surface; over-center type shiftable hoisting means beneath the upstream end of said support track at said main conveyor surface; and said support track when elevated and lowered, respectively elevating and lowering the surfaces of said rotatable elements above and below said main conveyor surface to form a selective diverter.

3. A conveyor apparatus with power diverting means comprising: means forming a main article conveying surface, and a branch article conveying surface at an angle to said main surface; article diverting means oriented along said branch surface and overlapping said main surface; said diverting means having a plurality of rotatable elements, and a circuitous, endless, flexible drive means drivingly and rotatably mounting said rotatable elements in a forward path portion oriented along said branch surface, and a return path portion below the level of said surfaces; an elongated support track underlying said rotatable elements in said forward path portion, enabling said rotatable elements to roll therealong and to project above the level of said main and branch surfaces; power operating means connected to said flexible drive means to drive said rotable elements along said support track and propellingly divert articles from said main surface to said branch surface; said support track being pivotally mounted near to, but spaced from its downstream end to said conveyor apparatus at said branch conveying surface; hoisting means beneath the opposite upstream end of said support track at said conveying surface; said upstream end of said hoist track being movable between a first raised position with said rotatable elements projecting slightly above said main conveyor surface to a second lowered position with said rotatable elements below said main conveyor surface, by hoisting and lowering of said hoisting means; and said downstream end of said support track being elevated slightly above said branch conveyor surface with lowering of said hoist means, supporting said rotatable elements slightly above said branch conveyor surface for continued propulsion of diverted articles along said branch conveyor surface.

4. Conveyor apparatus with article diverting means comprising: means forming an article conveyor surface, and an article receiving surface at an obtuse angle to said conveyor surface; article diverting mechanism overlapping said surfaces to have one end overlapping said conveyor surface and the opposite end overlapping said receiving surface; said mechanism including continuously circulatory, driven article propelling means; means to vertically shift said article propelling means to a first diverting position with the one end of said propelling means overlapping said conveyor surface projecting thereabove into the path of conveyed articles to propel them laterally from said conveyor surface, and to a second non-diverting position with said one end below said conveyor surface; and means to position said opposite end of said propelling means above said receiving surface, when said mechanism is in said second position, to continue to propel the diverted article.

5. Conveyor apparatus with a high speed take-off comprising: a first pair of side rails and a plurality of rotatable elements with axles supported on said side rails to form a first conveyor surface; a second pair of side rails at an obtuse angle to said first pair and a plurality of rotatable elements with axles supported on said second pair of side rails to form a second conveyor surface; high speed article transfer means overlapping said first and second conveyor surfaces, and oriented along said conveyor surface, including a pair of elongated spaced parallel mounting supports between said second pair of side rails and extending into said first conveyor surface; two pairs of spaced sprockets mounted in alignment at opposite ends of said supports, one pair beneath said first conveyor surface and the second pair beneath said second conveyor surface, a pair of flexible endless drive chains on said sprockets, oriented along said second surface while mounted in a circuitous path with a forward pass portion adjacent said first and second surfaces and a return portion thereabeneath; an elongated support track extending between said chains, below said first and second surfaces; a plurality of rotatable elements with high friction surfaces, between said chains, rotatably attached thereto, and suspended therefrom; said rotatable elements resting on said track to roll therealong when driven linearly by said chains; powered drive means operably connected to said chains; said track being pivotally mounted to said conveyor on a horizontal pivot axis near to but spaced from the downstream end of said track, at said second conveyor surface; over-center cam means under the upstream end of said track at said first conveyor surface, and power means to shift said cam means; said cam means shifting said upstream track end to an elevated postion elevating said rotatable elements above said first conveyor surface for article diverting, and to lowered non-diverting position below said first conveyor surface, and said downstream end of said track being simultaneously shifted with lowering of said upstream end, from a position with adjacent rolling elements projecting slightly above said second conveying surface to a slightly more elevated postion to continue article diversion propulsion even after the upstream end is lowered to a non-diverting position.

References Cited by the Examiner
UNITED STATES PATENTS

| | | | |
|---|---|---|---|
| Re. 25,673 | 11/1964 | Burt | 198—38 |
| 445,288 | 1/1891 | Pettigrew | 198—183 |
| 2,062,604 | 12/1936 | Paxton | 193—36 |
| 2,959,273 | 11/1960 | Sykes | 198—183 |
| 3,018,873 | 1/1962 | Burt | 198—38 |
| 3,138,238 | 6/1964 | De Good et al. | 198—127 |

EVON C. BLUNK, *Primary Examiner.*

HUGO O. SCHULZ, *Examiner.*

R. M. WALKER, M. L. AJEMAN, *Assistant Examiners.*